(12) United States Patent
Furukawa et al.

(10) Patent No.: US 8,469,075 B2
(45) Date of Patent: Jun. 25, 2013

(54) COATING FILM PEELING APPARATUS FOR RESIN MATERIAL

(75) Inventors: Hidekazu Furukawa, Tokyo (JP); Katsumi Okamoto, Tokyo (JP)

(73) Assignee: Satake Corporation, Tokyo (JP)

( * ) Notice: Subject to any disclaimer, the term of this patent is extended or adjusted under 35 U.S.C. 154(b) by 684 days.

(21) Appl. No.: 12/700,579

(22) Filed: Feb. 4, 2010

(65) Prior Publication Data
US 2010/0200173 A1     Aug. 12, 2010

(30) Foreign Application Priority Data

Feb. 6, 2009 (JP) .................................. 2009-026240

(51) Int. Cl.
*B32B 38/10* (2006.01)

(52) U.S. Cl.
USPC ........... 156/763; 156/715; 156/718; 156/759; 241/73; 241/74; 241/79; 241/79.2; 241/88.1; 451/32; 451/34; 451/51; 451/66; 451/180; 451/541; 451/547

(58) Field of Classification Search
None
See application file for complete search history.

(56) References Cited

U.S. PATENT DOCUMENTS

| 7,048,215 B2 * | 5/2006 | Irwin .............................. 241/73 |
| 2003/0085310 A1 * | 5/2003 | Galanty et al. ................. 241/73 |

FOREIGN PATENT DOCUMENTS

| JP | H07-276364 A | 10/1995 |
| JP | H11-58379 A | 3/1999 |
| JP | H11-286017 A1 | 10/1999 |
| JP | 2001-88128 A | 4/2001 |
| JP | 2005-96270 A | 4/2005 |

* cited by examiner

*Primary Examiner* — Mark A Osele
*Assistant Examiner* — Nickolas Harm
(74) *Attorney, Agent, or Firm* — Law Office of Katsuhiro Arai

(57) ABSTRACT

A coating film peeling apparatus for resin material includes: a peeling cylinder, a peeling roll installed therein with a space for a peeling process along an inner wall of the peeling cylinder, a resistance lid disposed to block a discharge port of the peeling cylinder, and a pressure adjustment part for adjusting an outflow rate and internal pressure of the peeling cylinder. The peeling cylinder is constituted by a polygonal-shaped angular columnar body having, as coating film pass-through holes, rows K of small holes and rows L of small holes and projection rings (angular embossments) provided alternately in multiple rows along a direction perpendicular to a rotating direction of the peeling roll.

4 Claims, 5 Drawing Sheets

COATING FILM PEELING APPARATUS FOR RESIN MATERIAL

BACKGROUND OF THE INVENTION

1. Field of the Invention

The present invention relates to a coating film peeling apparatus for resin material that removes the coating films on resin materials constituting defective vehicle bumpers or used bumpers on scrapped vehicles so that the resin materials can be recycled and processed into bumpers or resin parts for new vehicles to allow for reuse.

2. Description of the Related Art

Among traditional coating film peeling apparatus for resin materials used for bumpers, etc., one type of resin material peeling apparatus has been known wherein comprising: a peeling cylinder having a feed side on one end and release side on the other end; a peeling roll having multiple projections on the outer periphery and set in such a way as to form a space for a peeling process along the inner wall of the aforementioned peeling cylinder; a retaining plate set in such a way as to block the discharge port on the release side of the aforementioned peeling cylinder; and a pressure adjustment part that increases/decreases the push force of the aforementioned retaining plate and thereby adjusts the flow rate as well as internal pressure of the aforementioned peeling cylinder.

Patent Literature 1 describes a device wherein coarsely crushed pieces are fed between the peeling cylinder and peeling roll to peel the coating film on the surface of coarsely crushed pieces by rubbing off the coating film by the use of impact action and agitating action. This device simplifies the coating-film separation process, reduces cost, and also provides space-saving benefits, etc.

Patent Literature 2 describes a device that takes crushed material prepared by cleaning and crushing used bumpers and then drying the crushed pieces, wherein this crushed material is fed to said coating film peeling apparatus which is rotating in the same manner as a rice milling machine to peel coating film from the crushed material and thereby separate the coating film from the remaining recyclable base material [free from coating film]. This device can peel the coating film from the crushed material by agitating the crushed material under pressure and thereby shaving the coating film from the surface, which is beneficial in that all types of bumpers can be processed regardless of the type of coating film or method of coating.

Patent Literature 3 describes a coating film peeling apparatus comprising: a angular columnar body, in the peripheral wall of which coating film pass-through holes are formed through which to pass the coating film separated from crushed pieces; a coating film peeling part constituted by a peeling roll having projections and grooves formed on the columnar surface and also having gas injection holes through which to inject gas; a crushed pieces introduction part; a crushed pieces feed part; and a crushed pieces release part. This device can, through its projections and grooves provided on the columnar surface of the peeling roll, cut the coating film in advance to produce starting points from which to peel the coating film, and this mechanism further increases the peeling efficiency of coating film.

Patent Literature 4 describes a surface coating film peeling apparatus comprising: a peeling cylinder having a heating module; and a peeling roll housed inside the peeling cylinder wherein the peeling roll has multiple rubbing projections that are projecting from a roll axis in a spiral manner; wherein each of the aforementioned rubbing projections has a rubbing apex surface adjoining the inner surface of the peeling cylinder as well as an upward inclined front surface on the upstream side in the rotating direction of the peeling roll, to have waste resin material rubbed between the inner surface of the peeling cylinder and rubbing apex surface of the peeling roll. This device can give impact action to the waste resin material through rubbing, while keeping the generation of friction heat to a minimum, thereby permitting continuous processing.

However, the coating film peeling apparatus described in Patent Literatures 1, 2, 3 and 4 mentioned above have many coating film pass-through holes formed in the peripheral wall of the stripping cylinder through which to pass the coating film peeled from crushed pieces. One example of the shapes of these holes is shown in FIG. 6, where many long, thin elongated slits 102 are punched open in parallel in such a way that they run diagonally to the lengthwise direction of the peeling cylinder 101, while angular embossments 103 are provided to stand out between these elongated slits 102.

If such a peeling cylinder 101 having many coating film pass-through holes comprising elongated slits 102 and angular embossments 103 is used, then a micro-observation of the end face of an angular embossment 103 finds that the angular part has a sharp blade-like edge that would considerably shave the surface of the resin material from which to peel the coating film and bite into the recyclable material beyond the coating film layer of the resin material. In other words, the angular embossments 103 are provided for the purpose of improving the cutting action and, although they have no markedly adverse effects when the resin material is passed only once through the coating film peeling apparatus, an attempt to pass the resin material as much as four to five times through the coating film peeling apparatus with an intention to completely remove the coating film would cause the recyclable material to be excessively shaved and consequently the yield drops. In addition, the aforementioned elongated slits 102 also lower the yield in that if the resin material is a polygonal-shaped flat sheet with a thickness of 4 mm or less, the resin material comes out through the elongated slits 102 during the peeling process.

[Patent Literatures]

[Patent Literature 1] Japanese Patent Laid-open No. Hei 7-276364

[Patent Literature 2] Japanese Patent Laid-open No. Hei 11-58379

[Patent Literature 3] Japanese Patent Laid-open No. 2001-88128

[Patent Literature 4] Japanese Patent Laid-open No. 2005-96270

SUMMARY OF THE INVENTION

In light of the aforementioned problems, the present invention aims to offer a technical solution by providing a coating film peeling apparatus with improvements made to the shape of coating film pass-through holes provided in the peripheral wall of the peeling cylinder so that said apparatus can improve the yield of recyclable material by preventing the end faces of embossments formed on the peripheral wall of the peeling cylinder from biting into the recyclable material beyond the coating film layer of the resin material.

To solve the aforementioned problems, the invention according to Embodiment 1 devises a technical method/module in the form of a coating film peeling apparatus for resin material comprising: (i) a peeling cylinder having the feed side on one end and release side on the other end; (ii) a peeling roll having multiple projections on the outer periphery and set in such a way as to form a space for a peeling process along the inner wall of the aforementioned peeling cylinder; (iii) a resistance lid set in such a way as to block the discharge port on the release side of the aforementioned peeling cylinder; and (iv) a pressure adjustment part that increases/decreases the push force of the aforementioned resistance lid and thereby adjusts the flow rate as well as internal pressure of the aforementioned peeling cylinder; wherein the aforementioned peeling cylinder is constituted by a polygonal-shaped angular columnar body having coating film pass-through holes punched in the aforementioned angular columnar body, wherein these holes are comprised of: rows K of small holes where small perforated holes punched at a specified pitch are arranged in straight lines in the lengthwise direction of the aforementioned peeling cylinder; and rows L of small holes and projection rings where small perforated holes are punched at a wider pitch than rows K of small holes, while circular projection rings are provided between the aforementioned small holes wherein each ring is made up of a head hole and a larger-diameter convex embossment formed around the aforementioned head hole, and both of these small holes and projection rings are arranged in straight lines in the lengthwise direction of the aforementioned peeling cylinder in such a way that rows K of small holes and rows L of small holes and projection rings are provided alternately in multiple rows on the side facing the aforementioned peeling roll.

The invention according to Embodiment 2 is characterized in that the small perforated holes constituting rows K of small holes and small perforated holes and head holes constituting rows L of small holes and projection rings have the same hole diameter, while the convex embossments of circular projection rings constituting rows L of small holes and projection rings have a bottom diameter which is roughly twice the hole diameter of the aforementioned small holes and head holes.

The invention according to Embodiment 3 is characterized in that the small perforated holes constituting rows K of small holes are provided in close proximity to the small perforated holes and circular projection rings constituting rows L of small holes and projection rings, where the opening area of coating film pass-through holes punched in the angular columnar body is set within a range of 23% or more but less than 30% relative to the area of the inner area of the angular columnar body.

Based on the invention according to Embodiment 1, the coating film pass-through holes punched in the angular columnar body have the aforementioned configuration in which rows K of small holes and rows L of small holes and projection rings are arranged alternately, and this configuration provides a more gradual semi-spherical curved surface on the side face of the circular projection ring compared to the sharp blade-like end face of the angular embossment of a conventional design, and therefore the end face of the convex embossment does not bite into the recyclable material beyond the coating film layer of the resin material, while only the coating film can be peeled by the end face of the head hole of the circular projection ring, and consequently the yield of recyclable material can be improved.

In addition, based on the invention according to Embodiment 2 the process of making coating film pass-through holes can be simplified by punching small perforated holes of the same hole diameter to provide multiple rows K of small holes, and then forming, by use of a pressing method and between the aforementioned small perforated holes, convex embossments of roughly twice the size of the hole diameter of small holes to provide rows L of small holes and projection rings.

Furthermore, based on the invention according to Embodiment 3 the opening area of coating film pass-through holes punched in the angular columnar body is set within a range of 23% or more but less than 30% relative to the inner area of the angular columnar body (also referred to as an "opening ratio"), and this opening ratio increases the passing quantity of the peeled coating film pieces and also minimizes the possibility of resin material coming out through the coating film pass-through holes even when the resin material is a polygonal-shaped flat sheet with a thickness of 4 mm or less, and consequently the recyclable yield can be improved. Moreover, sufficient strength of the angular columnar body can be ensured, while the flow rate of resin material from the peeling cylinder and internal pressure of the peeling cylinder can be adjusted to appropriate levels.

BRIEF DESCRIPTION OF THE DRAWINGS

The present invention is further explained below with reference to drawings. It should be noted, however, that the present invention is not limited to these drawings. It should also be noted that the drawings are oversimplified for illustrative purposes.

Explanation of the symbols: 1: Coating film peeling apparatus; 2: Crushed pieces introduction part: 3: Coating film peeling part; 4: Crushed pieces feed part; 5: Crushed pieces release part; 6: Hopper; 7: Shutter; 8: Rotary valve; 9: Motor; 10: Peeling cylinder; 11: Hollow shaft; 12: Pulley; 13: Feed roll; 14: Peeling roll; 15: Belt; 16: Motor; 17: Motor pulley; 18: Angular columnar body; 19: Coating film collection gutter; 20: Recyclable material discharge port; 21: Resistance lid; 22: Pressure adjustment device; 23: Recyclable material release gutter; 24: Blast air nozzle; 25: Blast air passage; 26: Blast air feed pipe; 27: Blast air fan; 28: Small hole; 29*a*: Head hole; 29*b*: Convex embossment; 29: Circular projection ring; K: Line of small holes; L: Line of small holes and projection rings.

DETAILED DESCRIPTION OF THE PREFERRED EMBODIMENT

Figure 1:
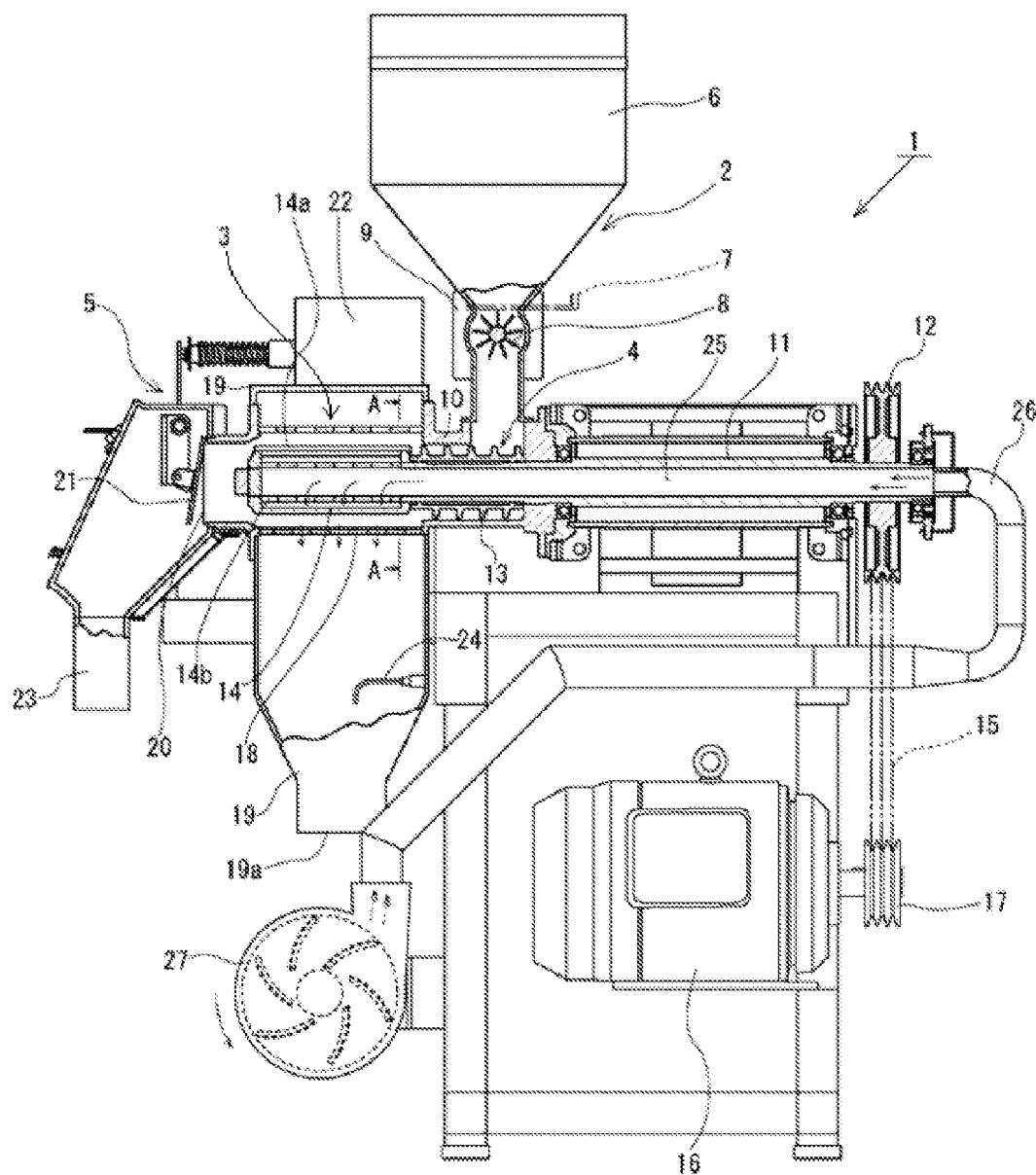
FIG. 1 is a longitudinal cross sectional view of a coating film peeling apparatus according to an embodiment of the present invention.
Figure 2:
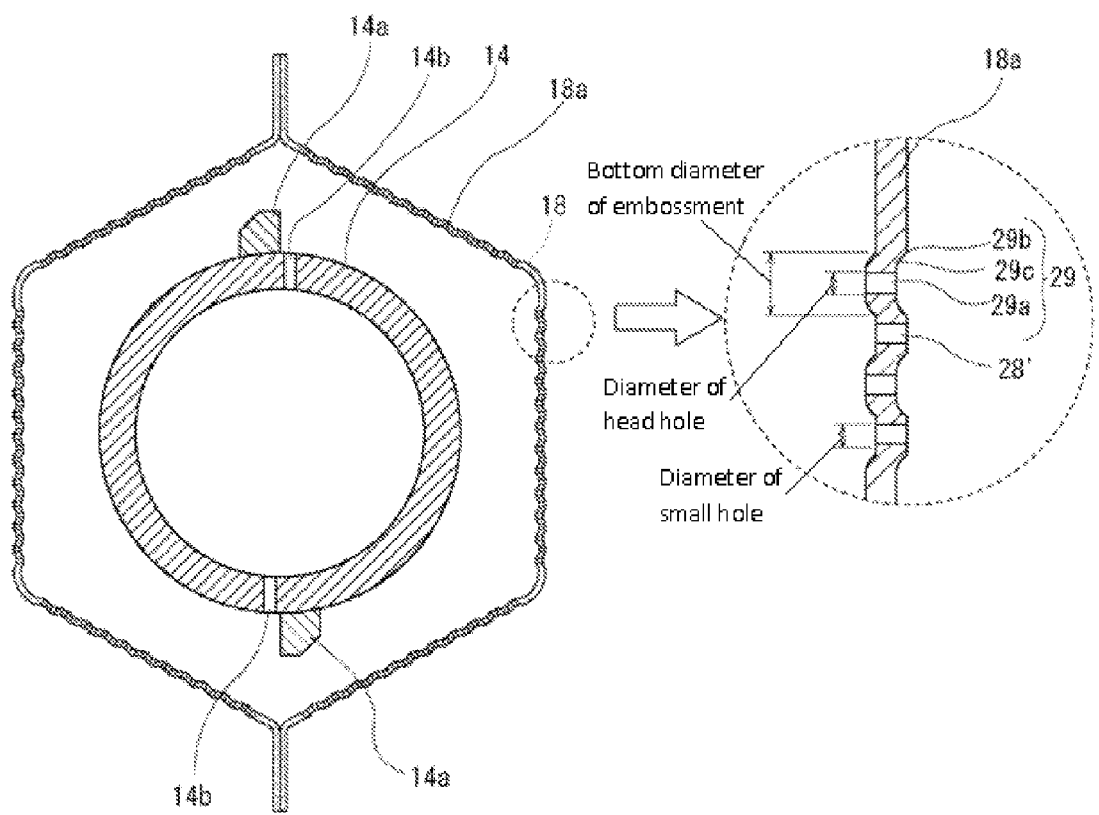
FIG. 2 shows a cross sectional view of FIG. 1 cut along line A-A as well as an enlarged view of the coating film pass-through holes in an embodiment of the present invention.
Figure 3:
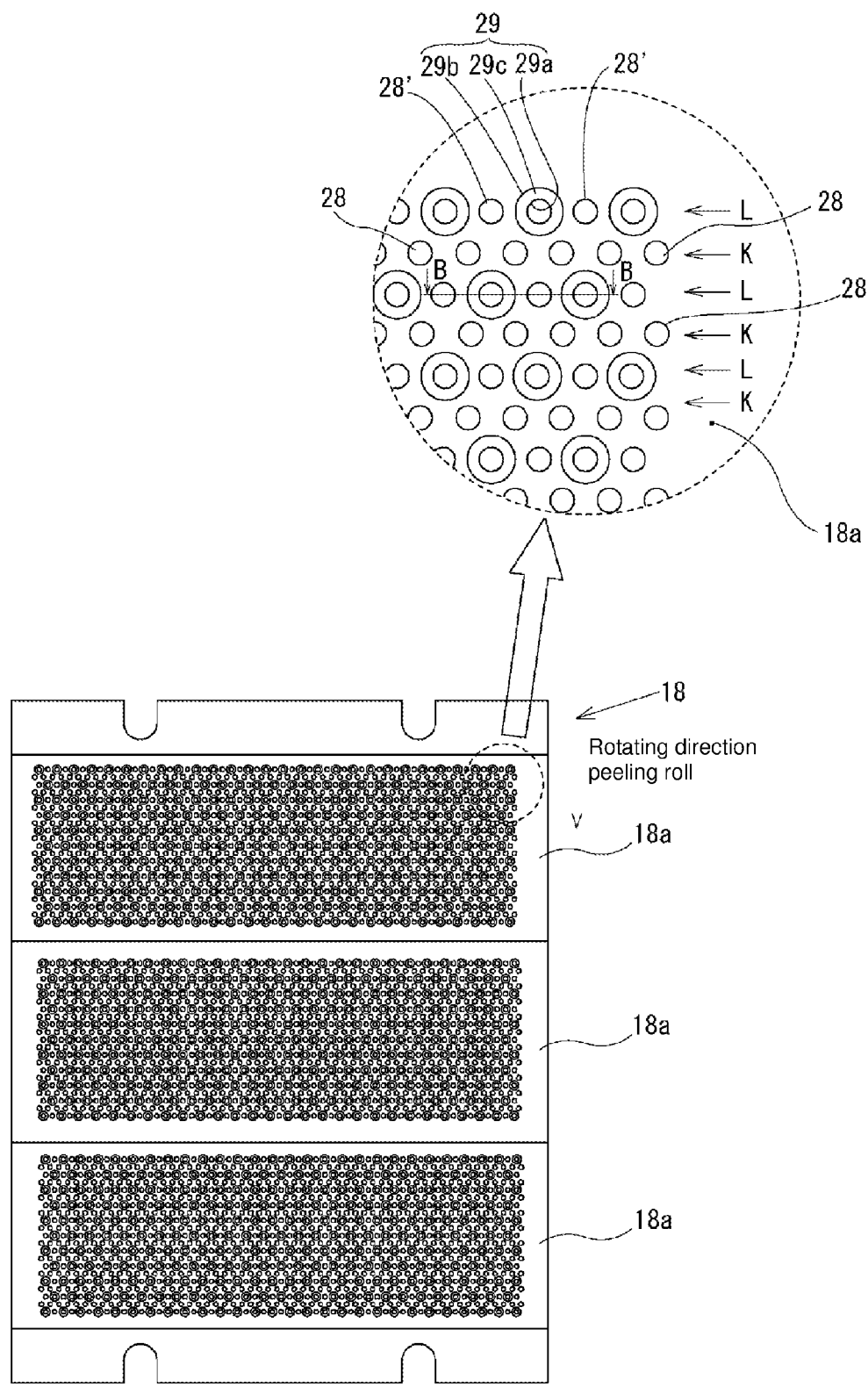
FIG. 3 shows a side view of the peeling cylinder as well as an enlarged view of the coating film pass-through holes in an embodiment of the present invention.
Figure 4A:
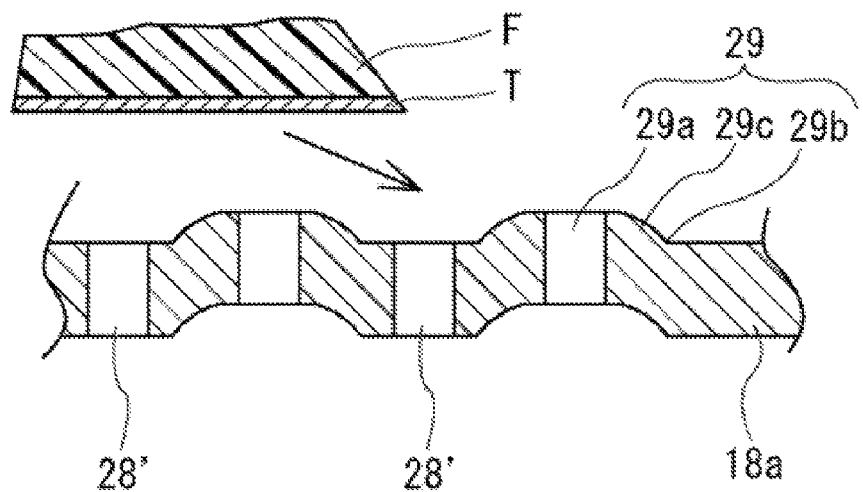
FIGS. 4(a) and (b) are each a cross sectional view of FIG. 3 cut along line B-B in an embodiment of the present invention.
Figure 4B:
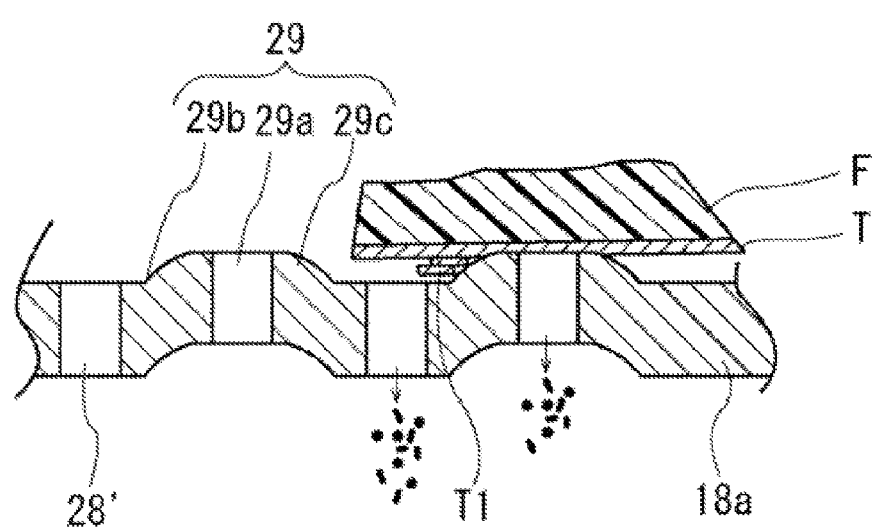
Figure 5:
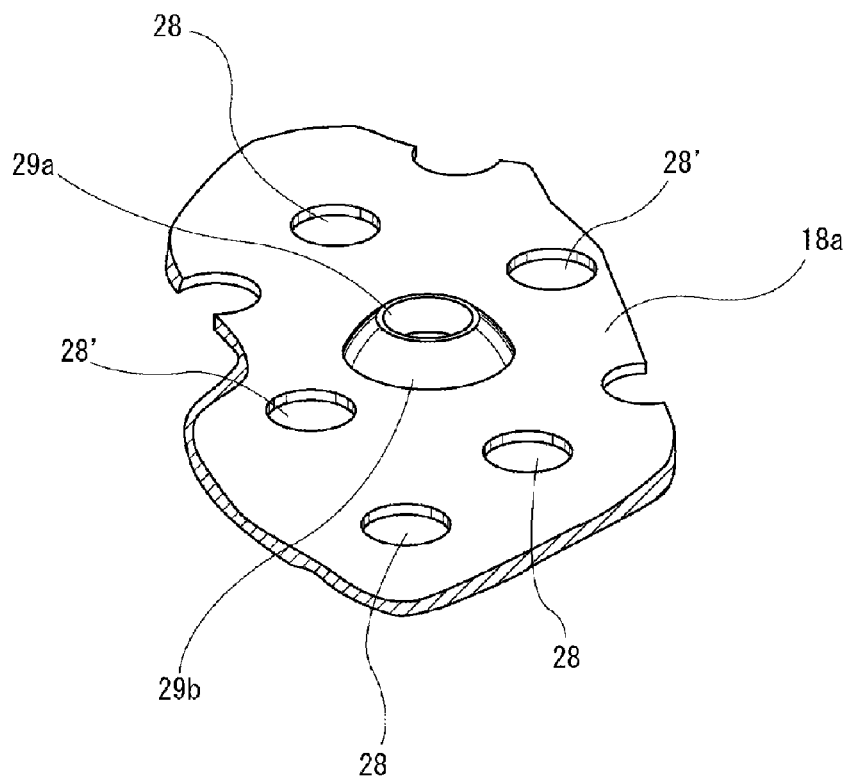
FIG. 5 is a partially enlarged oblique view of the coating film pass-through holes in an embodiment of the present invention.

The best mode for carrying out the present invention is explained by referring to drawings. FIG. 1 is a longitudinal section view of a coating film peeling apparatus pertaining to an embodiment of the present invention. FIG. 2 shows a section view of FIG. 1 cut along line A-A as well as an enlarged view of the coating film pass-through holes. FIG. 3 shows a side view of the peeling cylinder as well as an enlarged view of the coating film pass-through holes. FIG. 4 is a section view of FIG. 3 cut along line B-B. FIG. 5 is a partially enlarged oblique view of the coating film pass-through holes.

In FIGS. 1 through 3, the coating film peeling apparatus 1 comprises: (i) a crushed pieces introduction part 2; (ii) a peeling cylinder having the feed side on one end and release side on the other end; and (iii) a peeling roll; wherein said coating film peeling apparatus is also equipped with: (a) a coating film peeling part 3 that peels coating film from crushed pieces; (b) a crushed pieces feed part 4 that continuously feeds crushed pieces into the aforementioned coating film peeling part 3; and (c) a crushed pieces release part 5 that blocks the discharge port on the release side of the aforementioned peeling cylinder and continuously releases crushed pieces in a manner controlling the release of crushed pieces.

The crushed pieces introduction part 2 has: (i) a hopper 6 that stores crushed pieces; (ii) a shutter 7 that allows for manual opening/closing of the bottom of the aforementioned hopper 6; and (iii) a rotary valve 8 that intermittently feeds crushed pieces stored in the hopper 6, with a collapse of the bridge, into the crushed pieces feed part 4.

9 indicates a motor that intermittently turns/drives the rotary valve 8.

A peeling cylinder 10 can freely pass between the aforementioned crushed pieces feed part 4 and coating film peeling part 3, and a freely rotatable hollow shaft 11 is housed inside the aforementioned peeling cylinder 10. In addition, a pulley 12 is axially attached on one end of the aforementioned hollow shaft 11, while a feed roll 13 is axially attached on the other end where the crushed pieces feed part 4 is formed, and also a peeling roll 14 is axially attached in the area where the coating film peeling part 3 is formed. In other words, the feed roll 13 is positioned on the upstream side of the feed direction of crushed pieces, while the peeling roll 14 is provided concentrically to and integrally with the hollow shaft 11 in such a way that it is positioned on the downstream side of the feed direction of crushed pieces. Furthermore, the belt 15 passed around the pulley 12 is connected to the motor pulley 17 of a motor 16 so that the rotating force from the motor 16 is transmitted to the hollow shaft 11.

The aforementioned peeling roll 14 has multiple projections 14a and blast air grooves 14b formed on its peripheral surface, where the aforementioned peeling roll 14, angular columnar body 18 set on the peeling cylinder 10, and coating film collection gutter 19 that surrounds the aforementioned angular columnar body 18, form the coating film peeling part 3. The crushed pieces release part 5 comprises: (i) a recyclable material discharge port 20 that opens on the edge side of the peeling cylinder 10; (ii) a resistance lid 21 provided in such a way as to block this recyclable material discharge port 20 and exert contact pressure in a desired manner; (iii) a pressure adjustment device 22 that increases/decreases the push force of the aforementioned resistance lid 21 and thereby adjusts the flow rate of crushed pieces as well as internal pressure of the aforementioned peeling cylinder; and (iv) a recyclable material release gutter 23 that connects to the aforementioned recyclable material discharge port 20 and releases recyclable material to outside the machine. Also, the release port 19a at the bottom of the coating film collection gutter 19 is connected to the connection pipe leading to a bag filter (not illustrated) that collects peeled coating film. Also, a static pressure measuring/sensing nozzle 24 that detects whether or not the static pressure in this space is appropriate is housed inside the coating film collection gutter 19.

The aforementioned hollow shaft 11 has a blast air passage 25 formed in its hollow section, and a blast air feed pipe 26 is connected to one side of this blast air passage 25. Also, a blast air fan 27 is connected to the blast air feed pipe 26 so that compressed air generated by this blast air fan 27 is discharged from the blast air grooves 14b of the peeling roll 14 through the blast air feed pipe 26 and blast air passage 25, thereby promoting the release of coating film from the angular columnar body 18 to the coating film collection gutter 19.

The angular columnar body 18 set on the aforementioned peeling cylinder 10 is a hexagon in the example shown in FIG. 2, but the shape is not limited to hexagon and a heptagon, octagon, decagon or cylinder can also be used. Here, coating film pass-through holes are punched in the net sheet 18a of the angular columnar body 18. Coating film pass-through holes in this embodiment (refer to FIGS. 2 and 3) are comprised of: (i) rows K of small holes where small perforated holes 28 punched at a specified pitch are arranged in straight lines in the lengthwise direction of the peeling cylinder 10; and (ii) rows L of small holes and projection rings where small perforated holes 28', 28' are punched at a wider pitch than rows K of small holes, while circular projection rings 29 are provided between the aforementioned small perforated holes 28', 28' wherein each ring is made up of a head hole 29a and a larger-diameter convex embossment 29b formed around the aforementioned head hole 29a, and both of these small holes and projection rings are arranged in straight lines in the lengthwise direction of the peeling cylinder in such a way that rows K of small holes and rows L of small holes and projection rings are provided alternately in multiple rows on the side facing the aforementioned peeling roll 14. Based on this configuration in which rows K of small holes and rows L of small holes and projection rings are arranged alternately, a more gradual semi-spherical curved surface is provided on the side face 29c of the circular projection ring 29 compared to the sharp blade-like end face of the slit of a conventional design. Accordingly, the end face of the convex embossment 29b no longer bites into the recyclable material beyond the coating film layer of the resin material, while only the coating film can be peeled by the end face of the head hole 29a of the circular projection ring 29, and consequently the yield of recyclable material can be improved.

Also, the small perforated holes 28 constituting rows K of small holes and small perforated holes 28' and head holes 29a constituting rows L of small holes and projection rings have the same hole diameter (such as 2 mm), while the convex embossments 29b of circular projection rings 29 constituting rows L of small holes and projection rings have a bottom diameter (a base diameter) which is roughly twice the hole diameter of the aforementioned small holes 28, 28' and head holes 29a (such as 4 mm). This way, the process of making coating film pass-through holes can be simplified by punching small perforated holes 28 of the same hole diameter to provide multiple rows K of small holes, and then forming, by use of a pressing method and between the aforementioned small perforated holes 28', 28', convex embossments 29b of roughly twice the size of the hole diameter of small holes 28 to provide rows L of small holes and projection rings.

Also, in some embodiments, it is desirable that the small perforated holes 28 constituting rows K of small holes are provided in close proximity to the small perforated holes 28' and circular projection rings 29 constituting rows L of small holes and projection rings, where the opening ratio of coating film pass-through holes punched in the angular columnar body 18 is set within a range of 23% or more but less than 30%. This is because, if the opening ratio is lower than 23%, the passing quantity of coating film pieces is lower, and if the opening ratio exceeds 30%, the angular columnar body 18 itself has insufficient strength and the flow rate of crushed pieces from the peeling cylinder 10 and internal pressure of the aforementioned peeling cylinder may become no longer adjustable. Furthermore, within the above range, the possibility of resin material coming out through the coating film pass-through holes is minimized, even when the resin material is a polygonal-shaped flat sheet with a thickness of 4 mm or less, and this contributes to the improvement of yield.

Next, the specific operation is explained. When a scrapped bumper is made of polypropylene resin, for example, in the pre-processing stage before the coating film peeling process, the bumper is crushed by a crusher, such as a hammer mill, into crushed pieces with a thickness of 4 mm or less, a particle size of 15 mm or less and having a polygonal flat sheet shape. For the material that can be used favorably on the coating film peeling apparatus 1 in this embodiment, the volumetric weight of these crushed pieces should desirably be within a range of 400 to 600 g/liter and the angle of repose within a range of 45 to 65°. Attached to these crushed pieces is a coating film of acrylic resin or polyurethane resin which is used as the surface coating film on the scrapped bumper, and the thickness of this coating film is within a range of approx. 100 to 200 µm. These crushed pieces are passed four to five times through the coating film stripper 1 to have the coating film completely peeled from the crushed pieces for use as recycled material.

With the coating film peeling apparatus 1 in this embodiment, crushed pieces are first introduced to the hopper 6, and then the rotary valve 8 below the hopper 6 is driven and the shutter 7 is opened, upon which the bridge made of crushed pieces in the hopper collapses and crushed pieces reach the crushed pieces feed part 4. In the crushed pieces feed part 4, the rotating force from the motor 16 is transmitted to the feed roll 13 and the crushed pieces are continuously fed into the space between the angular columnar body 18 in the coating film peeling part 3 and the peeling roll 14.

In the coating film peeling part 3, the crushed pieces receive the agitating action from the multiple projections 14a, 14a formed on the peripheral surface of the peeling roll 14 as well as the cutting action from the angular columnar body 18, to peel the surface coating film. This is explained in detail by referring to FIGS. 4(a) and 4(b). These figures are each a cross sectional view of FIG. 3 cut along line B-B, and FIG. 4(b) shows a crushed piece F contacting the angular columnar body 18 where the crushed piece has a coating film layer T attached on it. When an appropriate contact pressure is applied to the crushed piece F by use of the agitating action of the peeling roll 14 and this crushed piece F collides with the circular projection ring 29, the coating film layer T breaks and a cutting action is generated, which then causes the coating film attached on the surface to peel off, as indicated by T1. At this time, the side face 29c of the circular projection ring 29 is a gradual semi-spherical curved surface, and therefore the end face of this circular projection ring 29 does not bite into the recyclable material beyond the coating film layer T, and also the coating film alone can be peeled, thereby improving the yield of recyclable material. In addition, even when the crushed piece F is a large flat sheet some part of the crushed piece F always remains in contact with the circular projection ring 29 because of the configuration, as shown in FIG. 3, whereby rows K of small holes punched in horizontal lines, and rows L of small holes and projection rings consisting of the circular projection rings 29 provided between the small holes 28', 28', are arranged alternately in the vertical direction, and therefore the peeling action is promoted. Also, rows L of small holes and projection rings comprise not only small holes 28' but also the circular projection rings 29 consisting of punched head holes 29a, and therefore the releasing action of the stripped coating film is increased.

After the coating film is peeled, crushed pieces are released continuously from the recyclable material discharge port 20 in a manner pushing and expanding outward the resistance lid 21 of the crushed pieces release part 5. To completely peel the coating film from crushed pieces, it is desirable that the crushed pieces released from the recyclable material discharge port 20 be returned to the hopper 6 and the operation of peeling the coating film from crushed pieces is repeated multiple times, such as two to ten times or so, or if necessary multiple coating film peeling apparatus 1 may be installed in stages instead of repeating the peeling operation. In addition, the transfer device which returns to the hopper 6 the crushed pieces released from the recyclable material discharge port 20 should preferably be one utilizing pneumatic piping that introduces crushed pieces into the high-speed air flows in the pipe and transfers the particles along with the air flows. A heater may also be installed on this pneumatic piping to heat the crushed pieces.

EXAMPLES

Example 1

For the coating film peeling apparatus, one having a crushed pieces introduction part 2, a coating film peeling part 3, a crushed pieces feed part 4, and a crushed pieces release part 5, was used as shown in FIG. 1.

For the coating film peeling part 3, a hexagonal angular columnar body 18 was used as shown in FIGS. 2 and 3, wherein the coating film pass-through holes were configured by: (i) rows K of small holes where small perforated holes 28 with a diameter of approx. 2 mm were punched in the net sheet 18a of approx. 2 mm in thickness and in horizontal lines at a specified pitch; and (ii) rows L of small holes and projection rings where small perforated holes 28', 28' with a diameter of approx. 2 mm were punched in lines different from the aforementioned rows K of small holes at a wider pitch than the rows K of small holes, while circular projection rings 29 are provided between the aforementioned small perforated holes 28', 28' wherein each circular projection ring consists of a head hole 29a with a diameter of approx. 2 mm and a convex embossment 29b with a diameter of approx. 4 mm formed around the aforementioned head hole 29a, and both of these small holes and projection rings are arranged in horizontal lines; wherein both rows K of small holes and rows L of small holes and projection rings are arranged alternatively in multiple rows on the side facing the aforementioned stripping roll.

A scrapped bumper made of polypropylene resin was used as a material, and this material was crushed into crushed pieces with a thickness of 4 mm or less, particle size of 15 mm or less and having a polygonal flat sheet shape. The volumetric weight of these crushed pieces was within a range of 400 to 600 g/liter and the angle of repose was within a range of 45 to 65°. Attached to these crushed pieces was a coating film of acrylic resin or polyurethane resin which was used as the surface coating film on the scrapped bumper, and the thickness of this coating film was within a range of approx. 100 to 200 µm.

Figure 6:
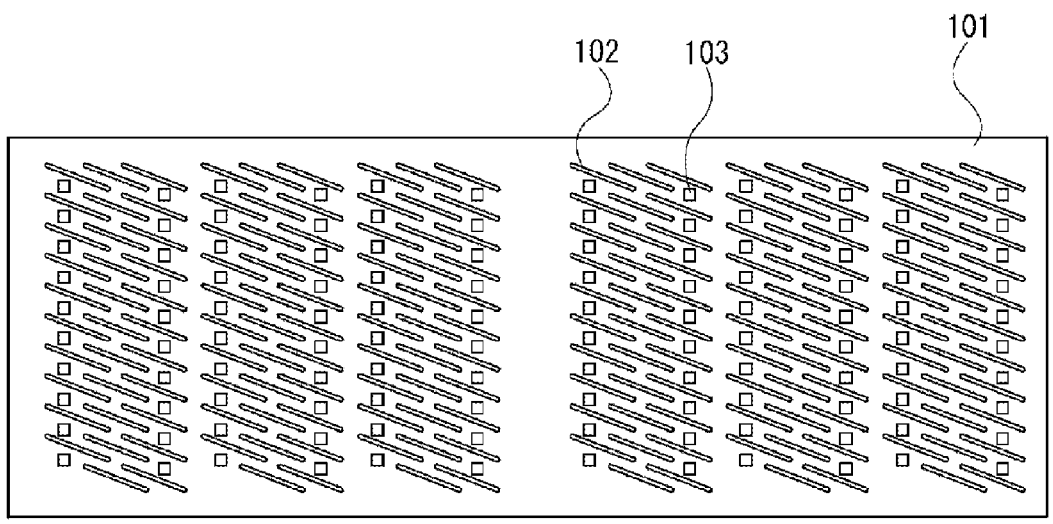
FIG. 6 is a side view of a conventional peeling cylinder.

The conventional coating film pass-through holes constituted by long thin slits (refer to FIG. 6) had the end faces of angular embossments 103 shaped like a sharp blade, and therefore these end faces shaved the surface of the resin material to peel the coating surface and bit into the recyclable material beyond the coating film layer of the resin material, and consequently the product yield was 63.8%. On the other hand, the coating film pass-through holes in Example 1 (refer to FIGS. 2 and 3) had a gradual semi-spherical curved surface on the circular projection rings 29, and therefore the end faces of these circular projection rings 29 did not bite into the recyclable material beyond the coating film layer of the resin material, and also because only the coating film could be peeled, the product yield was 76.9%. In addition, the percentage of crushed pieces F (refer to FIG. 4) with shaved corners was also low.

When the opening ratio was calculated for the coating film pass-through holes (refer to FIGS. 2 and 3) in Example 1, the ratio was 24%. On the other hand, the calculated opening ratio of conventional coating film pass-through holes constituted by long thin diagonal slits (refer to FIG. 6) was 22.5%. According to Example 1, where the opening ratio was larger than the conventional design, the passage quantity of coating film pieces was greater and also the possibility of resin material passing through the coating film pass-through holes was low even when the resin material was a polygonal-shaped flat sheet with a thickness of 4 mm or less, and these factors contributed to the improvement of the yield. Furthermore, it was possible to ensure sufficient strength of the angular columnar body and also adjust the flow rate of crushed pieces from the peeling cylinder and internal pressure of the peeling cylinder to appropriate levels.

The present invention can be applied as a coating film peeling apparatus for resin material for peeling/removing coating films on resin materials constituting defective vehicle bumpers or used bumpers on scrapped vehicles so that the resin materials can be recycled and processed into bumpers or resin parts for new vehicles to allow for reuse.

In the present disclosure, "the present invention" refers to at least one of the disclosure embodiments or at least one embodiment of the invention. In the present disclosure where conditions and/or structures are not specified, a skilled artisan in the art can readily provide such conditions and/or structures, in view of the present disclosure, as a matter of routine experimentation.

This application claims the priority to Japanese Patent Application No. 2009-026240, filed Feb. 6, 2009, and the disclosure of which is herein incorporated by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A coating film peeling apparatus for resin material comprising:
 a peeling cylinder having a feed side on one end and a release side on another end;
 a peeling roll having multiple projections on its outer periphery and disposed to form a space for a peeling process along an inner wall of the peeling cylinder;
 a resistance lid disposed to block a discharge port on the release side of the peeling cylinder; and
 a pressure adjustment part that is capable of increasing and decreasing the push force of the resistance lid and thereby adjusts an outflow rate and internal pressure of the peeling cylinder;
 wherein the peeling cylinder is constituted by a polygonal-shaped angular columnar body having coating film pass-through holes punched in the angular columnar body, wherein these holes are comprised of:
 rows K of holes where perforated holes punched at a specified pitch are arranged in straight lines in the lengthwise direction of the peeling cylinder; and
 rows L of holes and projection rings where perforated holes are punched at a wider pitch than are the holes on rows K, and where circular projection rings are provided between the holes on rows L wherein each ring is made up of a head hole and a convex embossment formed around the head hole, and both of these holes and projection rings are arranged in straight lines in the lengthwise direction of the stripping cylinder,
 wherein rows K of holes and rows L of holes and projection rings are each provided alternately in multiple rows on a side facing the stripping roll.

2. The coating film stripper for resin material according to claim 1, wherein the perforated holes constituting rows K of holes and the perforated holes and the head holes constituting lines L of holes and projection rings have approximately the same hole diameter, and convex embossments of the circular projection rings constituting rows L of holes and projection rings have a bottom diameter which is approximately twice the hole diameter of the perforated holes and the head holes.

3. The coating film peeling apparatus for resin material according to claim 2, wherein the perforated holes constituting rows K and the perforated holes and the circular projection rings constituting rows L of holes and projection rings are provided such that, an opening area of the perforated holes which are punched as coating film pass-through holes in the angular columnar body is set within a range of about 23% or more but less than about 30% relative to the inner area of the angular columnar body.

4. The coating film peeling apparatus for resin material according to claim 1, wherein the perforated holes constituting rows K and the perforated holes and the circular projection rings constituting rows L of holes and projection rings are provided such that, an opening area of the perforated holes which are punched as coating film pass-through holes in the angular columnar body is set within a range of about 23% or more but less than about 30% relative to the inner area of the angular columnar body.

* * * * *